(12) United States Patent
Teo et al.

(10) Patent No.: US 6,600,639 B1
(45) Date of Patent: Jul. 29, 2003

(54) PRECISION LOW VOLTAGE SUPPLY SYSTEM AND METHOD WITH UNDERVOLTAGE LOCKOUT CAPABILITIES

(75) Inventors: Siew Siong Teo, Sunnyvale, CA (US); Michael Eugene Broach, San Mateo, CA (US); Richard Frank, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/881,933

(22) Filed: Jun. 14, 2001

(51) Int. Cl.[7] .................................................. H02H 3/24
(52) U.S. Cl. .............................. 361/92; 361/92; 361/18
(58) Field of Search ........................... 361/92; 327/79, 327/143; 323/314; 340/663

(56) References Cited

U.S. PATENT DOCUMENTS

| | | | | | |
|---|---|---|---|---|---|
| 4,857,823 A | * | 8/1989 | Bitting | ........................ | 323/314 |
| 4,928,056 A | * | 5/1990 | Pease | ........................ | 323/314 |
| 5,122,920 A | * | 6/1992 | Pease | ........................ | 361/92 |
| 5,196,833 A | * | 3/1993 | Kemp | ........................ | 340/663 |
| 5,440,254 A | * | 8/1995 | Sundby | ........................ | 327/79 |
| 6,222,399 B1 | * | 4/2001 | Imbornone et al. | ........ | 327/143 |

* cited by examiner

*Primary Examiner*—David Nelms
*Assistant Examiner*—Thinh Nguyen
(74) *Attorney, Agent, or Firm*—Wagner, Murabito & Hao LLP

(57) ABSTRACT

An integrated circuit system and method provides a reliable low voltage reference including undervoltage lockout capabilities that prevent a premature or false response. A physical constant trigger circuit initiates a response based upon a physical constant (e.g. a stable point associated with a voltage summation in a transistor circuit with components configured to produce equal and opposite temperature coefficients). A response includes changing polarities of the transistor circuit at a predetermined inflection point. A comparator compares signals from the physical constant trigger circuit and determines when a change occurs in the response. A voltage divider provides a varying voltage to the physical constant trigger and when the voltage level corresponds to the physical constant it is utilized as the reference voltage. An input signal port conveys an input signal to the voltage divider and output port conveys an indication of the response (e.g., a desired reference voltage is available).

20 Claims, 5 Drawing Sheets

PRECISION LOW VOLTAGE SUPPLY SYSTEM AND METHOD WITH UNDERVOLTAGE LOCKOUT CAPABILITIES

FIELD OF THE INVENTION

The present invention relates to the field of integrated circuit design. More particularly, the present invention relates to a precision low voltage supply system and method with undervoltage lockout capabilities.

BACKGROUND OF THE INVENTION

Electronic systems and circuits have made a significant contribution towards the advancement of modern society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Frequently, it is desirable for an electronic system to operate at a relatively low voltage. Low voltage electronic systems typically provide significant benefits such as reduced power consumption, minimized heat dissipation problems, etc. However, electronic systems often depend upon accurate and reliable voltage sources and it is difficult to accurately determine if voltages are at a desired level in low voltage electronic systems. Voltages are often required to reach an appropriate level and be accurately defined for a system to operate properly, especially for a low voltage electronic system in which many tolerance ranges are very narrow.

A number of electronic components require voltage power supply rails to power up and reach a predetermined voltage level for the system to operate properly. For example, in the case of a switching regulator the reference circuit usually does not come up right away. In many systems a determination should be made if a voltage level on a rail is sufficient and if the circuit should turn on at all. If the circuit attempts to operate before the voltage reaches a desired level components may be damaged and unreliable results are likely. Inadequate voltage levels on power supply rails often have detrimental impacts on a number of circuits, including low voltage systems.

Low voltage electronic systems typically offer significant advantages over high voltage systems. Low voltage electronic systems usually have lower power consumption characteristics than higher voltage electronic systems. Power consumption is a critical concern in a variety of devices, particularly those with limited power supplies such as portable devices. The convenience advantages of mobile devices are very desirable and there is an increasing demand for advanced mobile devices that provide greater functionality. Advanced devices typically require a greater number of components (e.g., transistors) to achieve the enhanced functionality and the increased number of components put increased demands on the limited power supplies. By operating the components at lower voltages this increased demand on the limited power supplies is significantly less than components operating at higher voltages. However, operating at lower voltages typically means tolerances are much tighter and a number of features such as reference voltages are required to be very precise.

Integrated circuits typically utilize reference voltages to perform a number of operations and are often utilized in the performance of critical tasks. It is usually very important for a reference voltage level to be accurate and reliable. Components of many electronic systems are very sensitive and voltage references that do not dependably provide a voltage supply at a sufficiently precise level often have a detrimental impact on the performance and functionality of an electronic circuit. For example, numerous devices utilize comparators to perform a comparison to a reference voltage and a reference voltage that is not reliable and relatively precise usually has a detrimental impact on the accuracy of the comparison. The acceptable tolerance range for variations in a reference voltage is usually very narrow. The tolerance ranges for low voltage electronic systems are particularly small since a small absolute change in a low voltage system is usually a significant relative voltage change since the total range from zero to the maximum voltage is very limited.

Reliable low voltage references are not easily produced and reliably providing a precise voltage reference is often a difficult task. For example, low voltage avalanche devices often have difficulty providing a precise reference voltage. Most avalanche or zener diode devices have high doping concentrations making precise operations at low voltage very difficult if not impossible to achieve. Zener devices usually generate a lot of noise due to the basic noise of the breakdown mechanism and the load currents typically are restricted to less than the driving current. Zener devices also often include adverse breakdown characteristics and require temperature coefficient compensation measures. A temperature compensated zener reference is limited in terms of initial accuracy and loading, usually the best TC for the diode current must be carefully controlled.

What is required is an integrated circuit system and method that provides a reliable low voltage reference.

SUMMARY OF THE INVENTION

The present invention is an integrated circuit system and method that provides a reliable and precise identification of a desired voltage level. The reference voltage identification system and method of the present invention includes undervoltage lockout capabilities that prevent a premature or false response. In one embodiment of the present invention, a physical constant trigger circuit initiates a response based upon a physical constant. In one exemplary implementation, the physical constant is a stable point associated with a voltage summation in a transistor circuit (e.g., a delta VBE generator) with components configured to produce equal and opposite temperature coefficients. The physical constant trigger circuit includes response signals (e.g., the collector signals of transistors) with polarities that change at a predetermined inflection point (e.g., a voltage level associated with the stable point of the physical constant trigger circuit). A comparator compares the signals from the physical constant trigger circuit and determines when a change occurs in the response signals. An input signal port conveys an input signal to the physical constant trigger circuit and output port conveys an indication of the response (e.g., a desired reference voltage is available).

The present invention is easily adaptable to a variety of embodiments. In one exemplary implementation of the present invention, a voltage divider provides a varying voltage to the physical constant trigger and when a swept up voltage level corresponds to the physical constant it is utilized as the reference voltage. In one embodiment of the present invention, a lockout circuit ensures a supply rail reaches an appropriate voltage level and the reference voltage identification system and method does not provide a false indication that a particular voltage level is available.

DETAILED DESCRIPTION OF THE INVENTION

Reference will now be made in detail to the preferred embodiments of the invention, a precision low voltage supply system and method with undervoltage lockout capabilities, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Figure 1A:
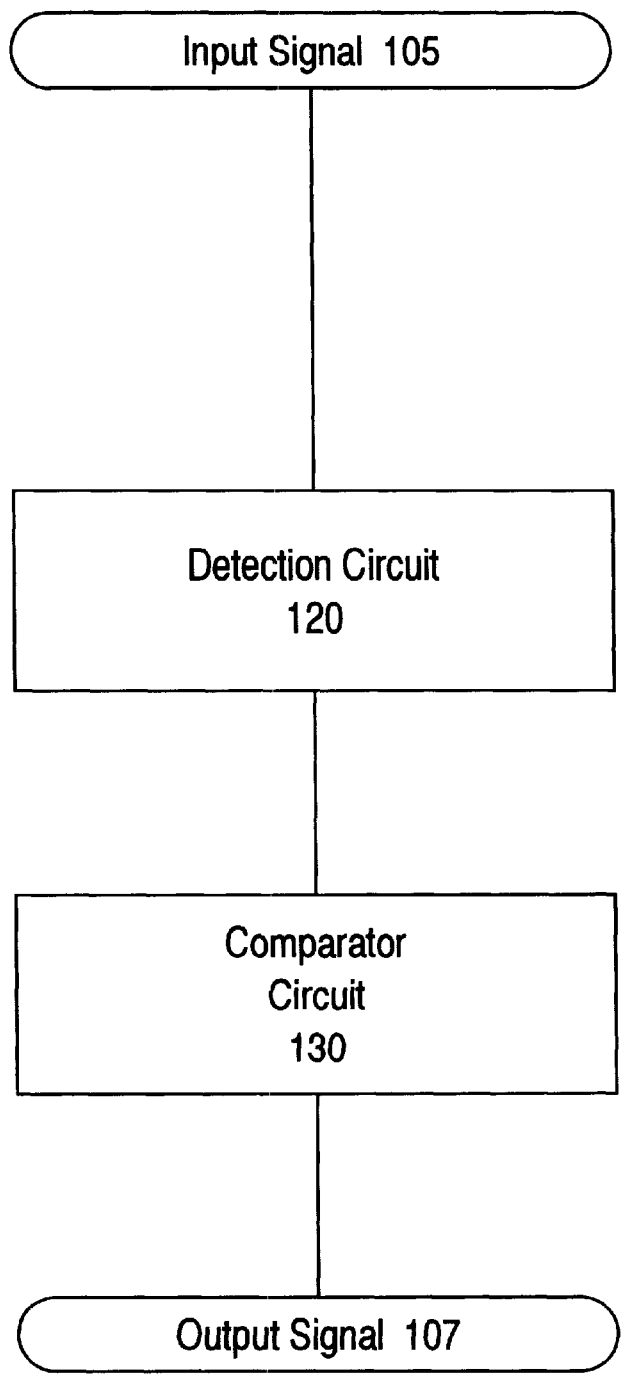
FIG. 1A is a block diagram of a reference voltage identification system, one embodiment of the present invention.
Figure 1B:
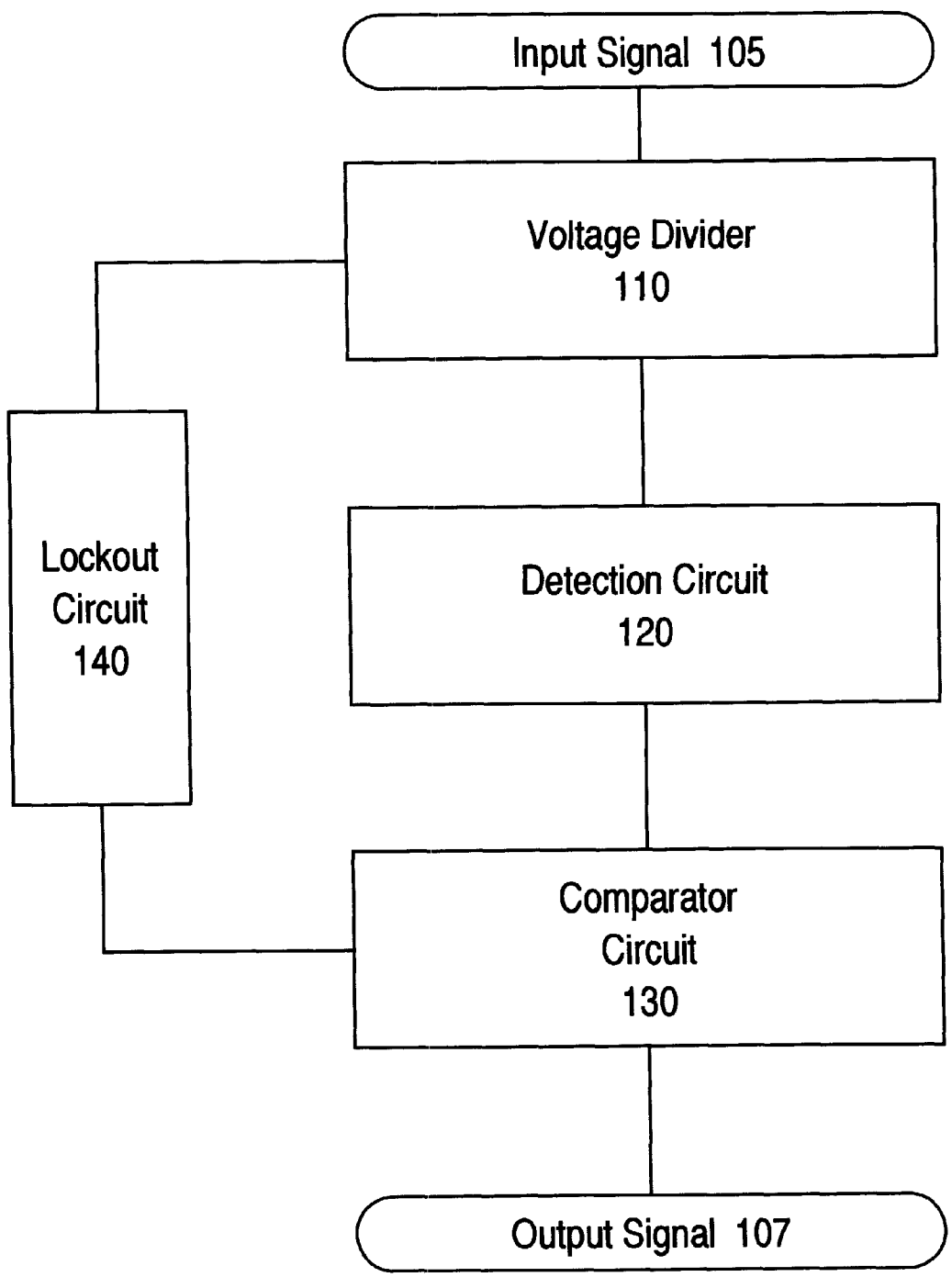
FIG. 1B is a block diagram of one embodiment of the present invention in which a reference voltage identification system includes a voltage divider and an undervoltage lockout circuit.

FIG. 1A is a block diagram of reference voltage identification system 100, one embodiment of the present invention. Reference voltage identification system 100 comprises input signal port 105, physical constant trigger circuit 120, comparator circuit 130, and output signal port 107. Physical constant trigger circuit 120 is coupled to input signal port 105, comparator circuit 130. FIG. 1B is a block diagram of one embodiment of the present invention in which reference voltage identification system 100 includes a voltage divider 110 and lockout circuit 140. Voltage divider 110 is coupled to input signal port 105 and lockout circuit 140 is coupled to voltage divider 110 and comparator circuit 130.

The components of reference voltage identification system 100 cooperatively operate to precisely identify a reference voltage level. Physical constant trigger circuit 120 causes response signals to change based upon a relatively precise physical constant (e.g., there may be slight variations that are insignificant from a practical standpoint). In one embodiment of the present invention, physical constant trigger circuit 120 includes bipolar components that produce a change in polarities of the response signals at a voltage level associated with a physical constant. In one embodiment of the present invention, transistors cause their collector signals to change polarities when their base voltage reaches an inflection point associated with temperature coefficient stable point of the transistor circuit. In one exemplary implementation of the present invention, the stable point is the sum of voltages produced by transistors and circuit components which provide equal and opposite temperature coefficients. Comparator circuit 130 compares signals from physical constant trigger circuit 120 and provides an indication when a change occurs in the signals. In one exemplary implementation of the present invention, the comparator compares polarity characteristics of said physical constant trigger circuit and identifies a change in said polarity characteristics. Input signal port 105 conveys an input signal to physical constant trigger circuit 120. Output port 107 conveys an indication of the response.

Voltage divider 110 provides a varying voltage to the physical constant trigger. In one exemplary implementation of the present invention the voltage divider sweeps a voltage signal up from ground to a predetermined level. Lockout circuit 140 provides a lockout signal that prevents a response before the physical constant requirement is satisfied. In one embodiment of the present invention, the lockout circuit also ensures a supply rail 295 is at an appropriate voltage level before the circuit begins to provide an indication the reference voltage is available.

In one embodiment of the present invention, components included in physical constant trigger circuit 120 operate based upon ratio multiples. The ratio multiples provide the advantage of nulling out the actual values used to derive the ratios. For example, a predetermined inflection point at which bipolar components of physical constant trigger circuit 120 change polarities does not change even though the values of the component characteristics change since changes in the values remain relative and fundamental ratios are maintained. In one exemplary implementation, the predetermined inflection point corresponds to a precis e physical constant that does not change (e.g., the summation of voltages across components with equal and opposite temperature coefficients). In one embodiment of the present invention, reference voltage identification system 100 is utilized to provide an indication a particular reference voltage has reached a precise predetermined level.

In one exemplary implementation, reference voltage identification system 100 is utilized as a precision low-voltage supply under-voltage lockout detect (UVLO) circuit with low supply current consumption. The physical constant trigger circuit provides the precision detect capability and the lockout circuit provides a lockout for operations below the precision detect voltage. Below the precise predetermined minimum supply voltage, reference voltage identification system 100 provides a lockout signal to indicate normal operations should not proceed. In one exemplary implementation, reference voltage identification system 100 is included in an integrated circuit (IC) product (e.g., a direct current (DC) to DC power converter) to detect a minimum operational power supply voltage for the IC.

Figure 2:
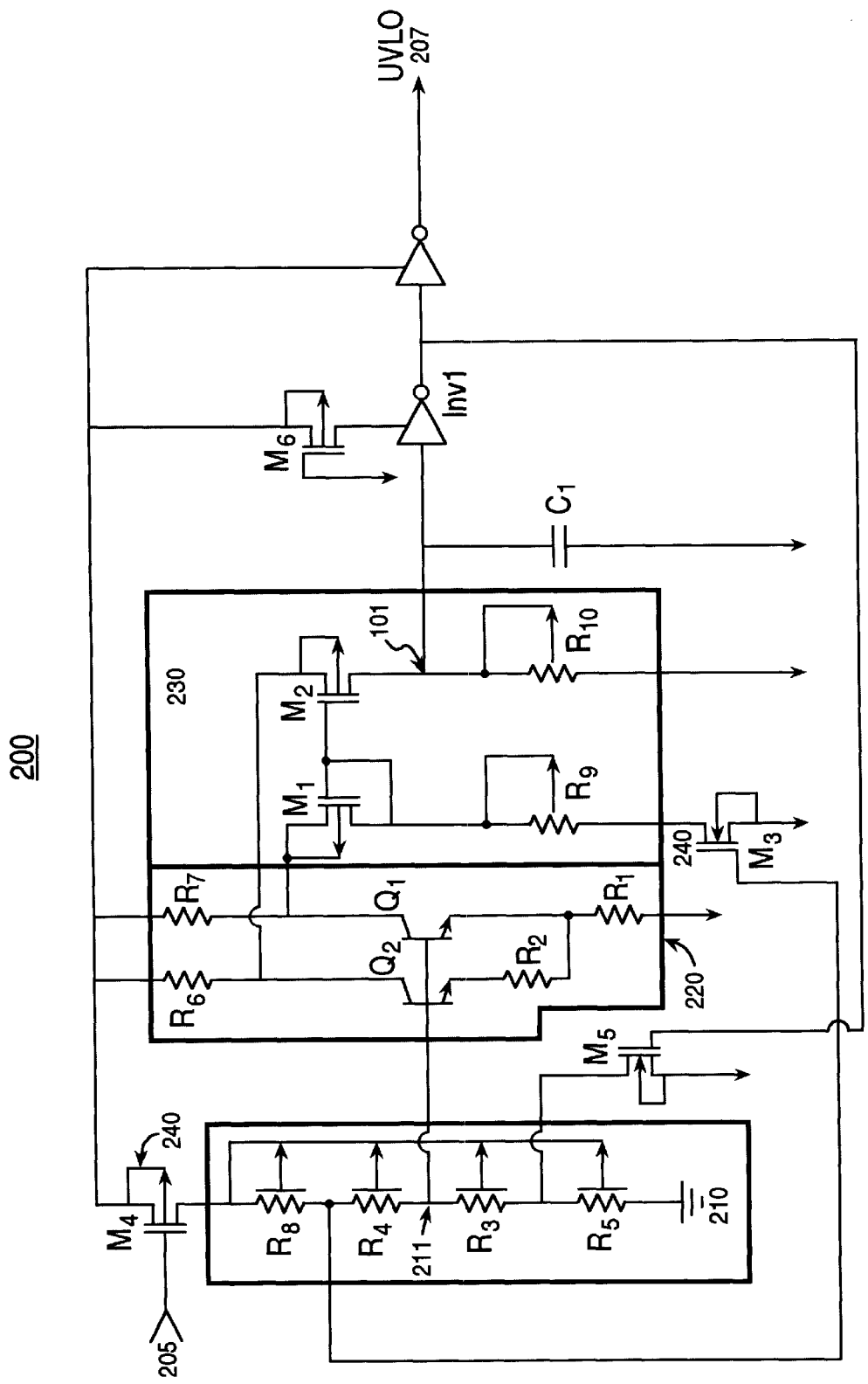
FIG. 2 is a schematic of reference voltage identification system with lockout capabilities, one embodiment of the present invention.

FIG. 2 is a schematic of reference voltage identification system 200, one embodiment of the present invention. Reference voltage identification system 200 comprises input signal port 205, voltage divider 210, physical constant trigger circuit 220, comparator circuit 230, lockout circuit 240, and output signal port 207. Similar to voltage identification system 100, physical constant trigger circuit 220 is coupled to physical voltage divider 210, comparator circuit 230 and output signal port 207. Input signal port 205 is coupled to voltage divider 210. Lockout circuit 240 is coupled to voltage divider 210 and comparator circuit 230. The components of reference voltage identification system 200 cooperatively operate to precisely identify a reference voltage level and provide a lockout signal at voltages below the precisely identified reference voltage level.

Voltage divider 210 provides a varying voltage to physical constant trigger 220. In one embodiment of the present invention, voltage divider 210 includes resistors R8, R4, R3, and R5. Resistors R8, R4, R3, and R5 are sequentially coupled to one another to provide different voltage taps at each node between the resistors. As each resistor is engaged in the series the voltage at the primary tap node 211 is changed. Primary tap node 211 is coupled to physical constant trigger circuit 220. In one exemplary implementation of the present invention, the voltage level at primary tap node 211 is swept up from zero volts (e.g., a ground voltage) to a level associated with a supply voltage conveyed by input signal port 205.

Physical constant trigger circuit 220 causes response signals to change based upon a precise physical constant. Physical constant trigger circuit 220 includes bipolar components transistor Q1 and Q2 and resistors R1, R2, R6 and R7. Resistors R7 and R6 are coupled to a voltage rail 295 and the collectors of transistors Q2 and Q1, respectively. Transistor Q2 is coupled to resistor R2 which is coupled to transistor Q1 and resistor R1. Transistors Q1 and Q2 have unequal current densities. In one exemplary implementation of the present invention, the transistors Q1 and Q2 are in a ten to one ratio relationship where transistor Q2 is ten times greater than transistor Q1. Resistors R7 and R6 are equal resistors respectively coupling the collectors of transistors Q2 and Q1 to rail 295. The voltage supplied to the bases of transistors Q1 and Q2 determine the respective polarity and direction of currents at the collectors of transistors Q1 and Q2. There is an inflection point voltage associated with the circuit stable point that when applied to the bases of transistors Q1 and Q2 results in equal collector voltages and currents. When the base voltages of transistors Q1 and Q2 are lower than that inflection voltage or higher than the inflection voltage then the voltages and currents at the collectors of transistors Q1 and Q2 are no longer equal.

In one embodiment of the present invention, the physical constant trigger circuit 220, includes a delta VBE generator that senses a voltage level and at a stable inflection point changes the polarities of the response signals. For example, the transistors Q1 and Q2 operate basically as a delta voltage base to emitter (VBE) generator with two equal resistors (R6 and R7) on the respective collectors of transistors Q1 and Q2. The delta VBE between the transistors Q1 and Q2 is dropped across resistor R2. When the currents flowing through Q1 and Q2 are equal there is a predetermined difference (e.g., ten times greater) in their current density, resulting in an LN difference (e.g., of 10) in the respective VBEs of the transistors. There is a ratio relationship between resistor R1 and R2 (e.g., R1 is 5 times bigger than R2) and the delta VBE is gained up so that it is about the same size as the VBE on transistor Q1. The VBE of transistor Q1 and the gained up voltage have equal and opposite temperature coefficients that when added to each other produce a flat voltage at the stable point level. For example, the voltage across resistor R1 and the voltage on transistor Q1 have equivalent but opposite signed temperature coefficients with opposite slopes that intersect at a stable physical constant point. When they are summed it results in a flat and horizontal output corresponding to the physical constant point providing a stable reference voltage.

Comparator circuit 230 compares signals from physical constant trigger circuit 220. In one embodiment of the present invention, physical constant trigger circuit 220 includes MOS transistors M1, M2 and M6, resistors R9 and R10, capacitor C1 and invertors INV1 and INV2. In one exemplary implementation of the present invention, collector voltages from transistors Q1 and Q2 are fed into comparator circuit 230 and the comparator detects when the two voltages cross polarities.

Lockout circuit 240 provides a lockout function. In one embodiment of the present invention, lockout device 240 includes MOS transistors M4 and M3. The lockout transistors M3 and M4 prevent the comparator from sensing wrongly when transistors Q1 and Q2, and resistors R7, R6 and R2 are powered up. MOS transistor M3 ensures the comparator output is correct. In this embodiment, the comparator output is output of MOS transistor M2 at the node between MOS transistor M2 and R10. In one embodiment of the present invention MOS transistor M3 basically guarantees zero volts at node 101 until the inflection voltage is reached during a sweep up from zero. In one embodiment of the present invention, MOS transistors M3 and M4 are there to make sure that at low voltage there is zero volts output at node 101, they keep it turned off until it is valid (e.g., reach the inflection voltage level). MOS transistors M3 and M4 are a secondary protection against false logic.

In one exemplary implementation of the present invention, transistors Q1 and Q2 are configured in a manner similar to a Brokaw cell except the bases of the transistors Q1 and Q2 are not coupled in a constant servo manner. In a traditional Brokaw cell bandgap implementation the bases of transistors Q1 and Q2 are included as part of a dosed loop in which the bases of transistors Q1 and Q2 are servoed to their respective collectors and the servo loop functions to keep their collector voltages and currents equal. In the preferred embodiment of the present invention, the bases of transistors Q1 and Q2 are allowed to float based upon an input signal (e.g. from voltage divider 210). When a predefined base voltage level is applied to the bases of the transistors Q1 and Q2 (e.g., the predefined physical constant) their respective collector voltages and currents are equal. When the bases of transistors Q1 and Q2 are lower or higher than the predefined voltage then the voltage and current at the collectors of transistors Q1 and Q2 are no longer equal.

In one embodiment of the present invention, the base voltage is set so that the condition of equal collector current is maintained. In one exemplary implementation of the present invention, when the system is powered up the base voltages of transistors Q1 and Q2 are swept up from ground (from zero). In one embodiment of the present invention everything is powered up before sweeping the base voltage of transistor Q1 and Q2 up. As the base voltage is swept up the voltage polarities at the collectors of transistors Q1 and Q2 pass each other. The collector current on one of them is larger than the other one until the base voltage reaches the inflection voltage level. When the inflection voltage is reached the current flowing in both collectors is the same. When the inflection voltage is passed then the polarity of the difference in the base voltages is reversed. In one exemplary implementation of the present invention there is a transition of the collector voltages which effects the current in the two resistors R7 and R6.

In one embodiment of the present invention, the base voltage is associated with the bandgap voltage of transistors Q1 and Q2. For example, the base voltage to Q1 and Q2 is supplied by a voltage divider designed to transit above a bandgap voltage of 1.27 volts which is the inflection voltage and is used as the reference voltage. When the voltage at the divider node coupled to bases of transistors Q1 and Q2 reaches 1.27 volts without curvature it is the same as the desired inflection voltage. The present invention is easily adaptable to a wide range of voltages. For example it is easily adaptable to range of between 1.22 and 1.28 for most processes, for example when the invention is utilized as part of a bandgap reference. When utilized as a bandgap reference, the bandgap reference output is the voltage at the bases of Q1 and Q2 which results in equal collector currents.

The present invention takes advantage of the characteristic that away from the predetermined inflection point, the collector currents are not equal. Below the inflection voltage one current is bigger and above the inflection voltage the other current is bigger. Thus, the collector currents cross each other at some point and that crossing point is the temperature stable point. It is a physical constant and because resistors R1 and R2 have a ratio relationship their resistive values, the actual value of the resistors cancel or nulls out. Thus the point at which the polarity of the voltages on the collectors of transistor Q1 and Q2 transcend each other is constant. The present invention has the advantage of nulling out temperature effects and process effects because it relies on the physical constant that produces a delta VBE (e.g., 1.27 volts) which is a constant within a few millivolts. The constant voltage may differ (e.g., 1.24 or 1.22) but the principle is applicable to any process where there are bipolars of any type available to do this.

In one embodiment of the present invention, one lockout is applied to the divider and one lockout is applied to the comparator. In one exemplary implementation of the present invention, MOS transistor M5 is included to compensate for Hysterisis effects. The present invention is readily adaptable to a variety of ways to provide for Hysterisis that comes from the output of the comparator and that goes into the feedback.

Figure 3:
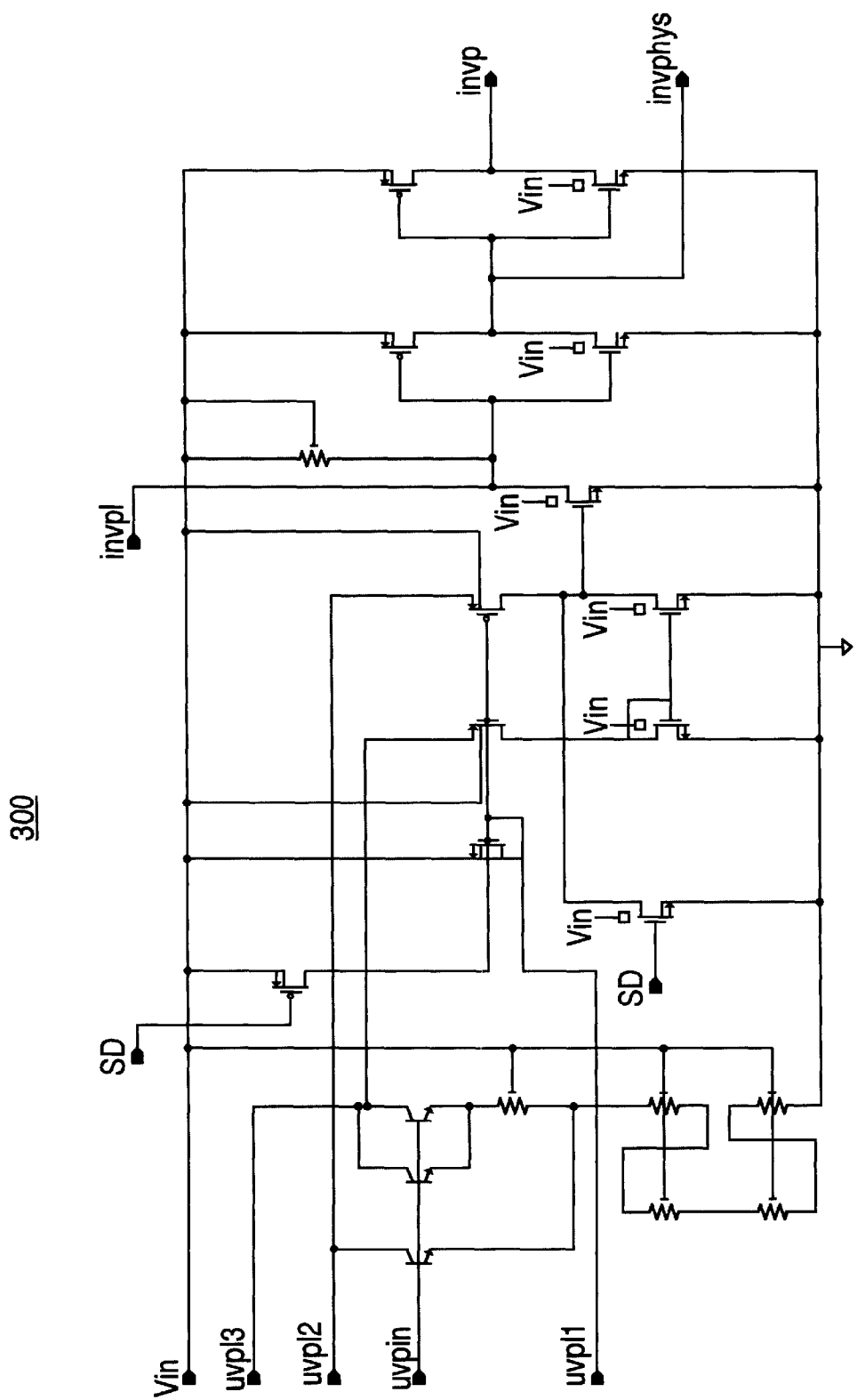
FIG. 3 is a schematic of another embodiment of a present invention reference voltage identification system.

FIG. 3 is a schematic of reference voltage identification system 300, one embodiment of the present invention. In one embodiment of reference voltage identification system 300, a physical constant trigger circuit includes bipolar components (e.g., transistors) that produce a change in polarities (e.g., on the collectors of the transistors) at a voltage level associated with a relatively precise physical constant. In one exemplary implementation, reference voltage identification system 300 is utilized as a precision low-voltage supply under-voltage lockout detect (UVLO) circuit and a lockout for operations below the precision detect voltage. Reference voltage identification system 300 includes shutdown features that prevent circuit operation during shutdown mode. In one exemplary implementation of reference voltage identification system 300 high impedance nodes are managed to prevent detrimental voltage leakage effects. FIG. 3 also illustrates that there are a variety of configurations for a present invention reference voltage identification system. The voltage supply circuit (not shown) for providing the base voltages to the physical constant trigger circuit may have a number of configurations. In one embodiment the base voltage is provided at a predetermined voltage level and in one embodiment the base voltage is swept up by a variety of devices (e.g., a resistor voltage divider or the base voltage is swept up by tying the base to diode tied FETs). There are also a number of circuit configuration coupled to the transistor collectors of the physical constant trigger circuit, including pull up resistors, current sources, etc.

Figure 4:
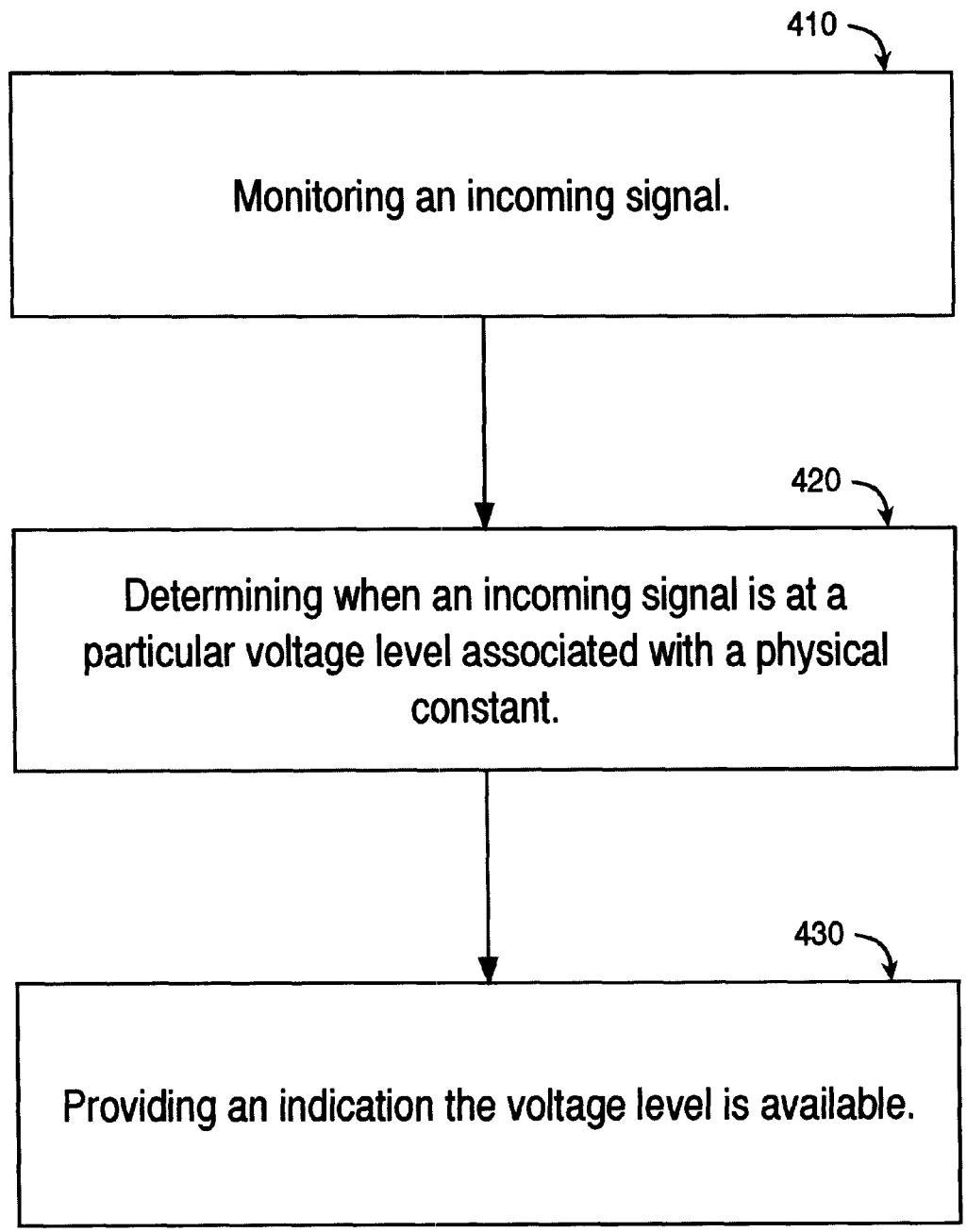
FIG. 4 is a flow chart of one embodiment of a present invention voltage identification method.

FIG. 4 is a flow chart of reference voltage identification method 400. Reference voltage identification method 400 precisely identifies when a reference voltage reaches a predetermined level based upon a physical constant. In one embodiment of the present invention, reference voltage identification method 400 includes lockout capabilities that prevent a premature or false indication of a reference voltage level.

In step 410 an incoming signal is monitored. In one embodiment of the present invention, the incoming signal is swept up from zero volts. In one embodiment of the present invention a delta VBE generator monitors the incoming signal. In one exemplary implementation of the present invention, the delta VBE generator is included in a physical constant trigger circuit.

In step 420 a determination is made when the incoming signal is at a particular voltage level associated with a physical constant. In one embodiment of the present invention the polarity of a pair of signals is changed based upon a physical constant. In one embodiment of the present invention, the physical constant is a stable point at which the base voltage of a transistor circuit (e.g., that includes transistors configured with equal and opposite temperature coefficients) produces equal currents and voltages at the collectors of the transistors in the circuit. The determination is made when the polarity of the response signals at the collectors of a transistors change.

In step 430 an indication is provided designating that the voltage level is reached. In one embodiment of the present invention, the indication is associated with a change in polarities of signals at the collectors of transistors. In one embodiment of the present invention, a lockout process is utilized to prevent a premature or false indication that a reference voltage is available.

Thus the present invention reference voltage identification system and method is an integrated circuit system and method that provides a reliable low voltage reference. The present invention includes undervoltage lockout capabilities that prevent a premature or false response.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A reference voltage identification system comprising:
   a physical constant trigger circuit for initiating a response based upon a physical constant requirement;
   a comparator coupled to said physical constant trigger circuit, said comparitor for comparing signals from said physical constant trigger circuit and determining when a change occurs in said response; said comparator coupled to said physical constant trigger;
   a voltage divider for providing a varying voltage to the physical constant trigger, said voltage divider coupled to said physical constant trigger;
   an input signal port for conveying an input signal to said voltage divider, said input signal port coupled to said voltage divider;
   a shutdown component for preventing circuit operation during shutdown mode, said shutdown component is coupled to said input signal port; and
   an output for conveying an indication of the response, said output signal port coupled to said comparator.

2. The reference voltage identification system of claim 1 wherein said physical constant trigger circuit includes bipolar devices in which said response initiation comprises changing polarities of signals of said bipolar devices at a predetermined inflection point.

3. The reference voltage identification system of claim 2 wherein said predetermined inflection point corresponds to said physical constant.

4. The reference voltage identification system of claim 1 wherein said comparator compares polarity characteristics of said physical constant trigger circuit and identifies a change in said polarity characteristics.

5. The reference voltage identification system of claim 4 further comprising:
   a voltage divider for providing a varying voltage to said physical constant trigger, said voltage divider coupled to said physical constant trigger circuit; and
   a lockout circuit for providing a lockout signal before said change in polarities occurs, said lockout circuit coupled to said inputs signal port.

6. The reference voltage identification system of claim 1 said physical constant is associated with a precision reference voltage.

7. A reference voltage identification system comprising:
   a physical constant trigger circuit including a plurality of transistors for initiating a response based upon a base emitter voltage associated with the temperature stable point of the transistors;
   a comparator coupled to said physical constant trigger circuit, said comparator for comparing signals from said physical constant trigger circuit and determining when a chance occurs in said response; said comparitor coupled to said physical constant trigger;
   a voltage divider for providing a varying voltage to the physical constant trigger, said voltage divider coupled to said physical constant trigger;
   an input signal port for conveying an input signal to said voltage divider, said input signal port coupled to said voltage divider;
   a shutdown component for preventing circuit operation during shutdown mode, said shutdown component is coupled to said input signal port; and
   an output for conveying an indication of the response, said output signal port coupled to said comparator.

8. The reference voltage identification system of claim 7 wherein the transistors are configure to produce voltages with equal and opposite temperature coefficients.

9. The reference voltage identification system of claim 7 wherein the voltage supplied to the bases of said plurality of transistors determine the respective polarity and direction of currents at the collectors of said plurality of transistors.

10. The reference voltage identification system of claim 7 wherein there is an inflection point voltage associated with the transistor circuit stable point that results in equal collector voltages and currents.

11. The reference voltage identification system of claim 7 wherein collector voltages from said plurality of transistors are fed into said comparator circuit and said comparator detects when the voltages cross polarities.

12. The reference voltage identification system of claim 7 further comprising a lockout circuit for providing a lockout function, said lockout circuit coupled to said voltage divider and said comparator.

13. The reference voltage identification system of claim 11 where said lockout circuit prevents said comparator from incorrectly sensing a predetermined voltage level during a power up process.

14. The reference voltage identification system of claim 11 where said lockout circuit ensures a zero volt output until a predetermined inflection voltage is reached during a sweep up from zero and provides secondary protection against false logic.

15. A reference voltage identification method comprising:
   monitoring an incoming signal;
   determining when the incoming signal is at a particular voltage level associated with a physical constant;
   preventing circuit operation during shutdown mode; and
   providing an indication that the particular voltage level is provided.

16. A reference voltage identification method of claim 15 further comprising the step of changing the polarity of a signals when the particular voltage level is provided.

17. A reference voltage identification method of claim 15 wherein a delta voltage base to emitter (VBE) generator is utilized to monitor said incoming signal.

18. A reference voltage identification method of claim 17 wherein said physical constant is a sum of the VBE and delta VBE of the delta VBE associated with a temperature stable point of the delta VBE generator.

19. A reference voltage identification method of claim 15 wherein said indication is associated with a change in polarities of a signal at the collector of a transistor.

20. A reference voltage identification method of claim 15 further comprising the step of preventing a false indication that a reference voltage is available.

* * * * *